United States Patent [19]
Kimura

[11] Patent Number: 5,061,469
[45] Date of Patent: Oct. 29, 1991

[54] PROCESS FOR PRODUCING SHAPED BORON NITRIDE PRODUCT

[75] Inventor: Yoshiharu Kimura, Ohmihachiman, Japan

[73] Assignee: Mitsubishi Kasei Corporation, Japan

[21] Appl. No.: 354,128

[22] Filed: May 19, 1989

[30] Foreign Application Priority Data

May 19, 1988 [JP] Japan ................ 63-122664

[51] Int. Cl.$^5$ ............ C01B 21/064; C01B 35/14
[52] U.S. Cl. ................ 423/290; 428/366; 501/95
[58] Field of Search ............ 423/290; 428/366; 264/345, 346; 156/DIG. 86, DIG. 99; 501/95

[56] References Cited

U.S. PATENT DOCUMENTS

| | | | |
|---|---|---|---|
| 2,808,314 | 10/1957 | Taylor | 423/290 |
| 4,545,968 | 10/1985 | Hirano et al. | 423/290 |
| 4,731,437 | 3/1988 | Taniguchi et al. | 528/394 |

FOREIGN PATENT DOCUMENTS

| | | | |
|---|---|---|---|
| 127708 | 5/1974 | Japan | 423/290 |
| 53-37837 | 12/1978 | Japan | |
| 61-47735 | 8/1986 | Japan | |
| 63-195173 | 12/1988 | Japan | |

OTHER PUBLICATIONS

Synthesis and Calcination of Boron Nitride Polymer; Mr. Kimura, delivered Nov. 11-12, 1986.
An Inorganic Polymer and Ceramic Material; Mr, Kimura, delivered 5/20/88.
Synthesis of Boron Nitride Fiber which precursor is B-tris (methylamino) borazine condensate; Mr. Kimura, delivered 11/17/88.
Boron Nitride Fiber by a Precursor Process; Mr. Kimura, delivered 7/88.
Boron Nitrogen Polymer. I. Mechanistic Studies of Borazine Pyrolyses; Journal of Polymer Science vol. 24 173-185 (1986).
Synthesis of Boron Nitride Ceramics; J. Am. Chem. Soc. vol. 109, 5556-5557 (1987).

Primary Examiner—Gary P. Straub
Assistant Examiner—Stephen G. Kalinchak
Attorney, Agent, or Firm—Jordan B. Bierman

[57] ABSTRACT

A process for the production of boron nitride is carried out by condensing a mixture of a B-tris-(loweralkylamino)borazine with an alkylamine in an inert gas atmosphere at a temperature of 150° C. or above to prepare a precursor, forming the precursor into a desired shape and then slowly heating the shaped precursor in an ammonia gas atmosphere until the precursor changes to a white boron nitride product.

The shaped boron nitride in a form of fiber is particularly useful as a reinforcement.

7 Claims, 3 Drawing Sheets

(1000°C)

(1000°C)

(1400°C)

(1800°C)

(PRECURSOR)

PROCESS FOR PRODUCING SHAPED BORON NITRIDE PRODUCT

FIELD OF THE INVENTION

This invention relates to a process for producing shaped boron nitride products. Further it relates to a process for producing a shaped boron nitride from its precursor.

BACKGROUND OF THE INVENTION

There is known a polymer compound, which is generally called boron nitride, having a recurring structure of a boron/nitrogen bond.

This boron nitride has a high melting point and excellent electrical, mechanical and chemical properties. Thus it is expected to be available for various uses including a reinforcement for composite materials, the diaphragm of a molten salt battery, an IC base plate and a crucible.

A known process for producing boron nitride fiber comprises heating B,B,B-triamino-N,N,N-triphenylborazine ($H_2NBN-C_6H_5)_3$ to 250° C. under a nitrogen atmosphere to thereby give a precursor, a condensed polymer of borazine, which would begin to soften at 150° C. to 200° C.; melting the obtained precursor by heating; spinning the molten precursor; and then slowly heating the precursor fiber thus obtained to a temperature higher than 1000° C. under a nitrogen or an ammonia atmosphere (JP-78-37837, examined Japanese Patent Publication). Other shaped boron nitride products, for example thin film, may be produced in a similar manner from the precursor.

However the shaped boron nitride product obtained by the above process is not purely white but slightly colored in gray or pale gray.

This coloration seems to be caused by the incomplete removal of phenyl groups bound to nitrogen atoms.

SUMMARY OF THE INVENTION

It is an object of the present invention, to provide a process for producing a shaped boron nitride product which comprises heating a mixture of a B-tris(loweralkylamino)-borazine and a higher alkylamine to yield a precursor, forming the resulted precursor into a desired shape and then slowly heating the shaped precursor to obtain a white boron nitride product, wherein the heating takes place in ammonia gas atmosphere until the temperature reaches to at least 600° C.

DETAILED DESCRIPTION OF THE INVENTION

Figure 1:
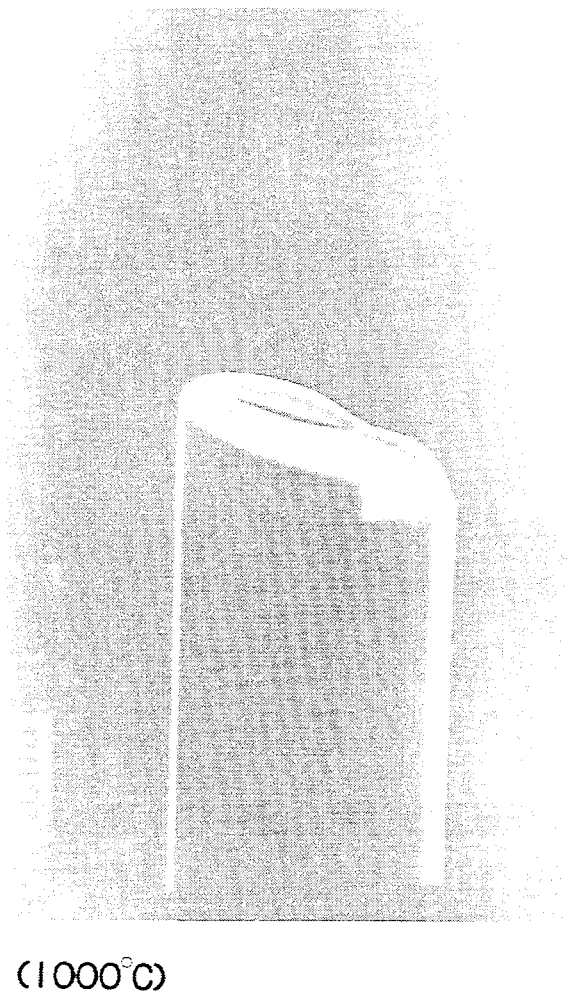
FIGS. 1 to 3 are scanning electron microscopic photographs each showing the form of a boron nitride fiber produced in Example 1.

According to the present invention, the shaped boron nitride product is produced in three steps; preparation of the precursor, forming the precursor into a desired shape such as fiber, sheet etc., and calcination of the formed precursor.

In the first step, the precursor is produced by heating a mixture of B-tris(loweralkylamino)borazine and higher alkylamine. Starting B-tris(loweralkylamino)-borazine is represented by general formula (I) below;

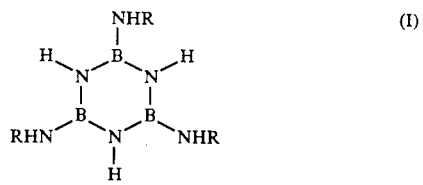

wherein R represents a lower alkyl group, preferably a methyl or ethyl group. B-tris(methylamino)borazine is the most preferred.

The borazine used in this invention easily gives a precursor of good properties in comparison with other borazine having organic substituents bound to the nitrogen atom in the borazine ring. The borazine used in this invention is believed to be easily condensed to form the precursor without cleaving the borazine ring during the condensation reaction. On the other hand, borazines having organic substituents bound to the nitrogen atom of the ring is likely to split between the nitrogen atom and boron atom of the ring during the condensation reaction. The difference to the reaction mechanisms seems to cause the difference of the precursors.

The starting higher alkylamine is a mono-alkylamine having a alkyl group which is higher than the alkyl group bonding to the starting borazine. Usually the starting higher alkylamine has four to twenty carbon atoms, preferably eight to eighteen carbon atoms. The mixture usually contains five to thirty parts by weight of the higher alkylamine with respect to one hundred parts by weight of the borazine. The precursor obtained from the mixture has a lower molecular weight and better properties in comparison with that obtained from the borazines without the higher alkylamine when both are prepared by heating at the same temperature. The precursor resulting from the mixture is especially suitable to produce a fiber through a melt spinning process.

The ratio of the higher alkylamine in the mixture may be lowered, but the precursor obtained may become too viscous and have poor spinning properties. On the other hand, a mixture having a higher ratio of the higher alkylamine is likely to produce a precursor having a significantly lower viscosity which cannot be spun into fibers. Thus, the mixture preferably has five to fifteen parts by weight of the higher alkylamine with respect to one hundred parts by weight of the borazine.

The mixture is heated over the melting point of the borazine in an inert gas atmosphere, usually at 140° to 300° C., preferably 150° to 250° C., for over 30 minutes. The heating time less affects properties of the resulted precursor than the heating temperature. The precursor thus obtained is solid at room temperature, but melts into viscous liquid at about 90° C. It seems to be formed of a mixture of condensed borazines having higher alkylamine bonded to the boron atom.

Then the precursor thus obtained is formed into any desired shape. Particularly, the precursor of the present invention may be spun into fibers, which is one of the most important and expective utilities thereof to be used as reinforcements. Of course, the precursor may be formed into shapes of film, IC base plate or a crucible, if desired.

The shaped product is then calcined by heating slowly in an ammonia gas atmosphere until the precursor changes into boron nitride. In the calcining process, the shaped product is to be heated in ammonia gas atmosphere until temperature reaches at least at 600° C. The ammonia gas used herein may be diluted with inert gas, such as nitrogen gas to a certain extent. The heating is preferably continues until the temperature reaches 1500° C. to 1800° C. since higher temperature yields boron nitride product with better properties. The heating may be carried out in two steps; in the first step the precursor is heated in an ammonia atmosphere until it reaches at least 600° C., and in the second step is further heated in an inert gas such as nitrogen atmosphere upto a temperature of 1500° C. to 1800° C.

The heating rate is usually 2° to 20° C./min., preferably 5° to 15° C./min. Lower heating rate may yield a boron nitride product with better properties, but in most cases the heating at lower rate such as lower than 2° C./min. is not desirable in economical standpoint.

The process of the present invention may be shown with reference to the following scheme, as a model.

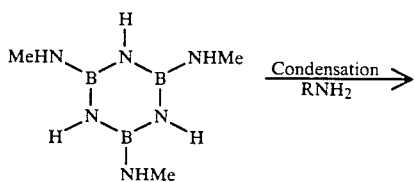

wherein Me represents methyl group
and R represents lauryl group

[II]

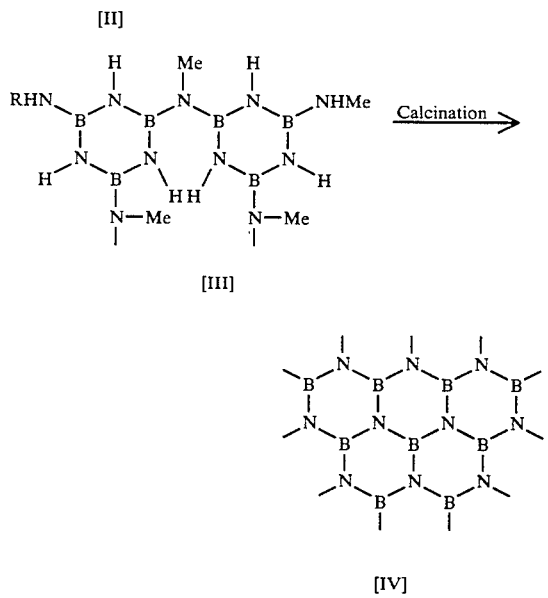

[III]

[IV]

The formula (III) represents the model of chemical structure of the precursor. It illustrates that some borazine rings have lauryl amino group connected to the boron atom and the rest do not.

The formula (IV) represents the model of chemical structure of the boron nitride fibers thus obtained.

According to the present invention, a boron nitride product with white color and good properties is easily produced. The present invention is especially suitable for the production of boron nitride fiber since the precursor obtained according to the present invention is so easily available for producing precursor fibers through melt spinning process.

To further illustrate the present invention, and not by way of limitation, the following Examples will be given.

EXAMPLE 1

50 g of laurylamine was added to 500 g of B-tris(methylamino)borazine represented by the following formula (I) and thoroughly mixed therewith. The obtained mixtures were heated to 150°, 200° and 250° C. respectively in a nitrogen gas atmosphere for two hours. Thus 455 g, 430 g and 375 g of a precursor were obtained respectively.

The precursor obtained at 200° C. was subjected to melt-spinning through a nozzle of approximately 70 μm in diameter at 100° C. The obtained precursor fibers were calcined in an ammonia gas atmosphere until the temperature reach to at 1000° C., 1400° C. and 1800° C. respectively, each at a heating rate of 10° C./min. to yield boron nitride fibers in each case. In calcining process over than 1000° C. the ammonia was replaced with nitrogen gas when the temperature reaches at 1000° C. The product obtained in calcining at 1800° C. has a white color.

Figure 2:
Figure 3:
Figure 4:
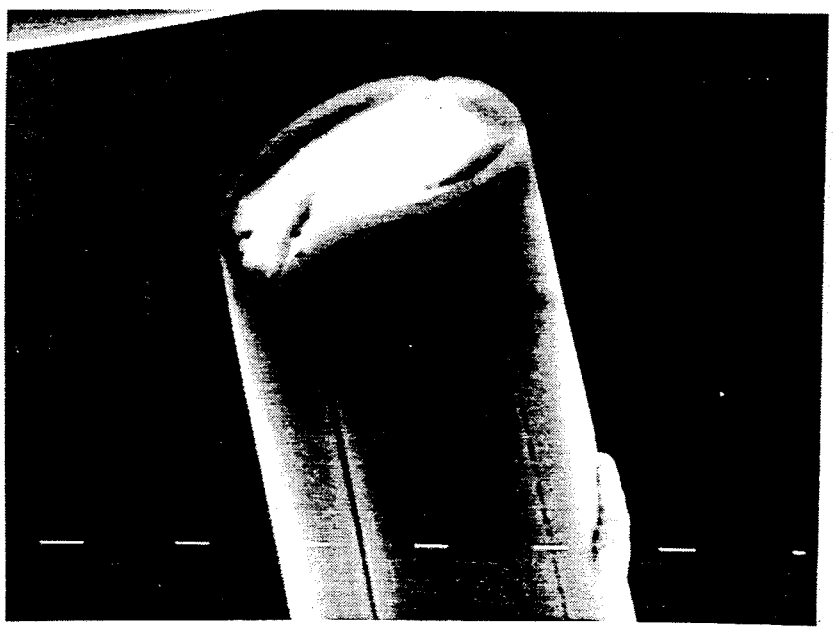
FIG. 4 is a scanning electron microscopic photograph which shows the form of a precursor fiber produced in Example 1.

FIGS. 1 to 3 are scanning electron microscopic photographs of the boron nitride fiber calcined at 1000° C., 1400° C. and 1800° C. respectively, while FIG. 4 is that of the melt-spinning fiber precursor at 100° C.

These boron nitride fibers show a scanning electron microscopic photographs of the fiber shown a smooth surface without having any defect in the cross section. These figures indicate that each boron nitride fiber has a dense structure.

The boron nitride fiber calcined at 1000° C. had a tensile strength of 0.5 GPa and a elastic modulus of approximately 50 GPa.

The boron nitride fiber calcined at 1400° C. and 1800° C showed each an improved tensile strength and an elevated elastic modulus, compared with the one calcined at 1000° C.

On the other hand, boron nitride fibers obtained by calcining the precursor fiber under nitrogen gas atmosphere throughout the calcining process at a temperature of as high as 1800° C. showed a gray color which might be caused by the residual carbonized organic groups.

While the invention has been described in detail and with reference to specific embodiments thereof, it will be apparent to one skilled in the art that various changes and modifications can be made therein without departing from the spirit and scope thereof.

What is claimed is:

1. A process for producing a shaped boron nitride fiber, said process comprising:
   heating a mixture of a B-tris (loweralkylamino) borazine selected from the group consisting of B-trismethylamino borazine and B-trisethylamino borazine, and a higher mono-alkylamine having 4 to 20 carbon atoms, to yield a precursor;
   shaping the precursor into a fiber; and
   heating the fiber in an ammonia atmosphere to at least 600° C. to obtain a white boron nitride fiber.

2. A process for producing a shaped boron nitride product as claimed in claim 1, wherein the B-tris(loweralkylamino)-borazine is B-tris(methylamino)borazine.

3. A process for producing a shaped boron nitride product as claimed in claim 1 wherein the alkyl group in the higher alkylamine has from eight to eighteen carbon atoms.

4. A process for producing a shaped boron nitride product as claimed in claim 1, wherein the higher alkylamine is mixed at a ratio of 5 to 30 weight parts with respect to one hundred parts by weight of B-tris(-loweralkylamino)borazine.

5. A process for producing a shaped boron nitride product as claimed in claim 1, wherein the heating of the mixture is conducted at a temperature between 140° C. to 300° C. to form a precursor.

6. A process for producing, a shaped boron nitride product as claimed in claim 1, wherein the heating of the shaped precursor is conducted at a rate of 5 to 15° C./min. until the temperature reaches to at least 600° C.

7. A process for producing a shaped boron nitride product as claimed in claim 1, wherein the heating of the shaped precursor is conducted until the temperature reaches to 1500° C. or over thereof.

* * * * *